Figure 1:
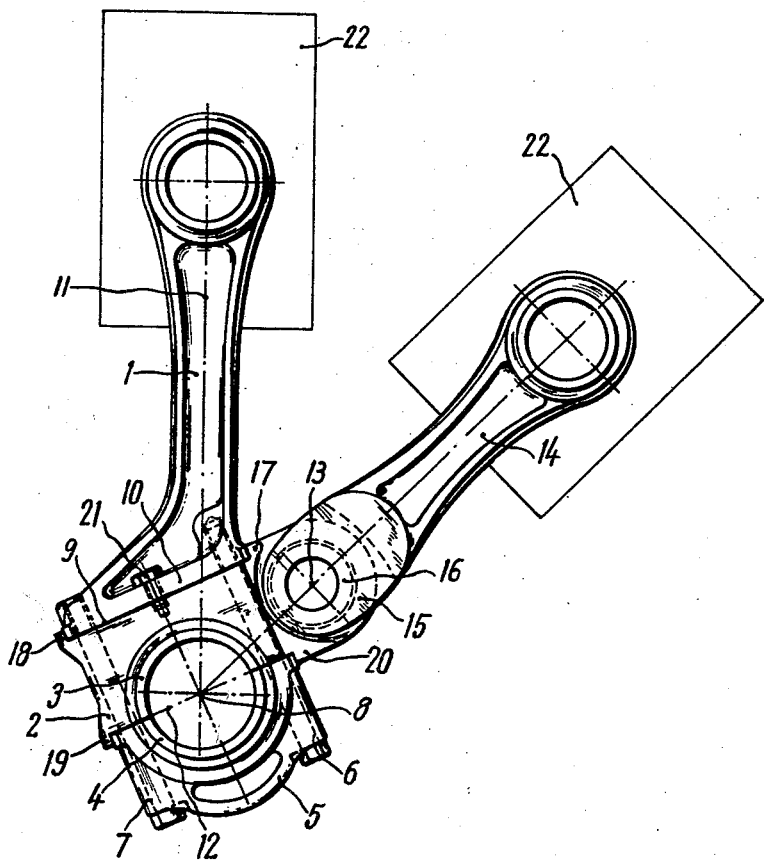

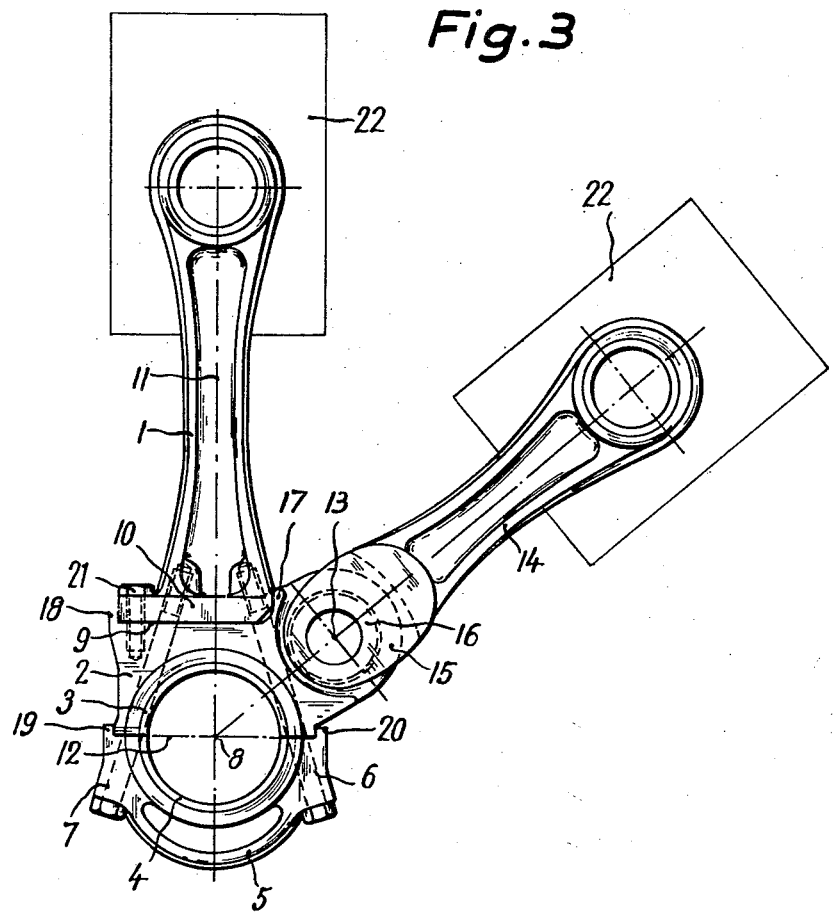

3,176,542
CONNECTING ROD ARRANGEMENT
Werner Mönch, Mannheim-Feudenheim, Germany, assignor to Motoren-Werke Mannheim A.G. vorm. Benz Abt. Stat. Motorenbau, Mannheim, Germany, a German company
Filed Nov. 17, 1960, Ser. No. 69,857
Claims priority, application Germany, Dec. 3, 1959,
M 43,582
13 Claims. (Cl. 74—580)

This invention relates to connecting rod and crank-pin bearing arrangements for V-type piston engines having a V-angle equal to or less than 90°, in which an auxiliary connecting rod associated with a piston of one side of the V is pivoted to the crank-pin bearing of a main connecting rod associated with a piston of the other side of the V, and in which the crank-pin bearing consists of an upper part detachably fixed to the foot of the main connecting rod, and a bearing cover detachably fixed to said upper part. Both the main connecting rod and the auxiliary connecting rod can be withdrawn through their respective cylinders after detaching the bearing cover.

The heretofore known arrangements of the kind just described, if the plane of division of the crank-pin bearing is at right-angles to the longitudinal axis of the main connecting rod, are not suitable for the most frequently occurring V-angles equal to or less than 90°, since the pivoting point of the auxiliary connecting rod on the bearing has an unserviceable, unfavourable position for high working pressures. The main and auxiliary connecting rods, if the plane of division of the bearing cover is inclined to the longitudinal axis of the main connecting rod, are suitable it is true for V-angles equal to or less than 90°, but have the disadvantage that the bearing division plane lies in the main loading zone of the crank-pin bearing, so that under the influence of the bearing pressure, displacements may occur between the bearing halves, which the usually very thin bearing brasses cannot resist, and which may endanger the working reliability of the bearing when the brasses have thicknesses of only hundredths of a millimeter. To reduce this danger, it is necessary in the known arrangements having an inclined division plane, to construct the connection of the bearing halves, which is highly stressed by the forces of the gas pressures, in the form of a splined or serrated connection, the teeth of which are lapped so all or almost all the teeth are in bearing contact. In the case of the connecting rods of large diesel engines in particular, this machining involves very considerable expense.

According to the present invention there is provided a connecting rod and crank-pin bearing arrangement in a V-type piston engine having a V-angle equal to or less than 90°, the arrangement comprising a main connecting rod associated with a piston of one side of the V and an auxiliary connecting rod associated with a piston of the other side of the V, the auxiliary connecting rod being pivoted to the crank-pin bearing of the main connecting rod, and the crank-pin bearing consisting of an upper part, detachably fixed to the foot of the main connecting rod and a bearing cover detachably fixed to said upper part, both the main connecting rod and the auxiliary connecting rod being withdrawable through their respective cylinders, after detaching the bearing cover from the upper part, wherein the auxiliary connecting rod is pivoted to said upper part of the crank-pin bearing.

Figure 2:
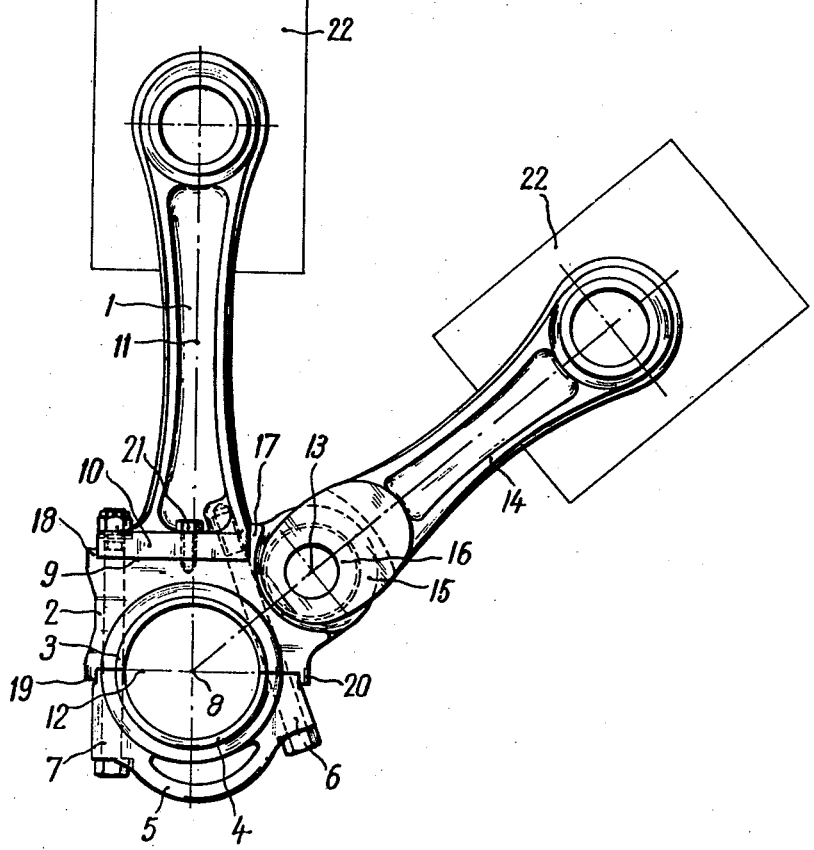

For a better understanding of the invention and to show how the same may be carried into effect reference will now be made, by way of example, to the accompanying drawings, in which:

FIGURE 1 is an end elevation of a connecting rod and crank arrangement of a V-type internal combustion piston engine in which the plane of division of the crank-pin bearing is inclined to the longitudinal axis of the main connecting rod, FIGURE 2 is an end elevation of a similar arrangement, in which the aforesaid plane of division is at right-angles to the longitudinal axis of the main connecting rod, and in which the connecting rod bolt adjacent the pivoting point of the auxiliary connecting rod is inclined to the longitudinal axis of the main connecting rod, and FIGURE 3 is an end elevation of an arrangement similar to that of FIGURE 2 with the difference that the connecting rod bolts on both sides of the crank-pin are arranged inclined to the longitudinal axis of the main connecting rod.

In the drawings like reference numerals indicate like parts.

The upper bearing part 2 of each crank-pin bearing, which part 2 together with bearing brass halves 3 and 4 and a bearing cover 5 forms a crank-pin bearing of an internal combustion engine with V-arrangement of the cylinders, is fixed to a main body 1 of the connecting rod by means of connecting rod bolts 6 and 7. In each arrangement illustrated, the V-angle is 45°, but in other embodiments it may assume values up to 90°. One or two connecting rod bolts 6 and 7 may be provided in each case. Where there are more than two bolts 6 they are spaced from each other in a direction parallel to the bearing axis 8. When two bolts 7 are employed they are similarly spaced. The plane of division 9 between the upper bearing part 2 and the foot 10 of the main body 1 of the connecting rod may be either inclined (as in FIGURE 1), or at right-angles to (as in FIGURES 2 and 3), the longitudinal axis 11 of the main body of the connecting rod. The plane of division 12 between the upper bearing part 2 and the bearing cover 5 is parallel to the plane 9 of the same arrangement. The planes 9 and 12 are parallel to the bearing axis 8. Each connecting rod bolt 6 lies in a plane inclined to the longitudinal axis 11. Each connecting rod bolt 7 may likewise lie in a plane inclined to the axis 11 and may be either parallel to the associated bolt or bolts 6 or in mirror-image relationship to the bolt or bolts 6, the axis 11 forming the axis of symmetry. Each bolt 7 may also be arranged parallel to the axis 11 as in FIGURE 2. On the upper bearing part 2 is a substantially semi-circular lug 15, which is embraced by the auxiliary connecting rod 14 and receives a pivot pin 13 which secures the rod 14 to the lug 15. The upper bearing part 2 has a shoulder 17, which is adjacent the auxiliary connecting rod 14 and projects away from the crank beyond the plane 9, the shoulder 17 co-operating with one side of the foot 10. Another shoulder 18 on the part 2 projects beyond the plane 9 and co-operates with the opposite side of the foot 10. The upper bearing part 2 also has shoulders 19 and 20 projecting away from the main body beyond the plane 12 and co-operating with opposite sides of the bearing cover 5. A screw 21 passed through the foot 10 enters the upper bearing part 2 and serves during assembly to hold together the main connecting rod foot 10 and the upper bearing part 2, so that the bearing can be easily assembled. The width dimensions of the main connecting rod foot 10 and the upper bearing part 2 are selected so that both parts, with the latter one connected to the auxiliary connecting rod 14 by the pivot pin 13, can be withdrawn together with the pistons 22 through the engine cylinders (not shown). In doing this, the upper bearing part 2 will of course be swung into the most favourable position relatively to the auxiliary piston rod 14.

I claim:
1. In a V-type engine having pistons in cylinders arranged in pairs at an angle of not greater than 90°: a connecting rod arrangement for the pistons of each pair of cylinders, each said connecting rod arrangement comprising a main connecting rod having opposite ends one of which is adapted for being coupled to one of the pistons of the associated pair, an auxiliary connecting rod having opposite ends one of which is adapted for being coupled to the other of the pistons of the associated pair, said main connecting rod including a main body, an integral flange constituting a foot at the end of the main body remote from the associated piston, an upper bearing part, a bearing cover, and connection means detachably connecting together the foot, the upper bearing part and the bearing cover in that order, said upper bearing part and bearing cover having openings which define a circular bore with a central axis when the bearing part and cover are connected together, said bore being adapted for the accommodation of a crank-pin extending coaxially in said bore, said upper bearing part and bearing cover having smooth flat surfaces in mating engagement, said connection means comprising connecting rod bolts located on opposite sides of said bore, said bolts each having an axis, the axes of the bolts lying in a plane which is perpendicular to the axis of said bore, and means connecting the auxiliary connecting rod at the end thereof remote from the associated piston to the upper bearing part for pivotal movement about an axis located on a side of one of the connecting rod bolts which is opposite the bore such that the latter connecting rod bolt extends between the bore and the said axis about which the auxiliary connecting rod is pivotally connected to the upper bearing part, whereby with the connecting rod bolts removed, the main body is free from the remainder of the main connecting rod and the auxiliary connecting rod is still connected to the upper bearing part for pivotal movement whereas the upper bearing part and bearing cover are disconnected.

2. An arrangement according to claim 1, wherein the plane of division between said upper bearing part and said foot and the plane of division between said upper bearing part and said bearing cover are parallel with the axis of the bore and inclined to the longitudinal axis of the main connecting rod.

3. An arrangement according to claim 1, wherein said upper bearing part includes a projection co-operating with that side of the foot of the main connecting rod that is adjacent the auxiliary connecting rod.

4. An arrangement according to claim 1, wherein said upper bearing part has projections co-operating with opposite sides of the foot of the main connecting rod.

5. An arrangement as claimed in claim 1, wherein said upper bearing part has a projection co-operating with one side of the bearing cover.

6. An arrangement as claimed in claim 1, wherein said upper bearing part has projections co-operating with opposite sides of the bearing cover.

7. An arrangement as claimed in claim 1, wherein said upper bearing part includes projections co-operating with opposite sides of said foot and projections co-operating with opposite sides of said bearing cover.

8. An arrangement according to claim 1, wherein the plane of division between said upper bearing part and said foot is parallel to the axis of the bore and at right-angles to the longitudinal axis of the main connecting rod.

9. An arrangement according to claim 1, wherein the plane of division between said upper bearing part and said bearing cover is parallel to the plane of the division between said upper bearing part and said foot.

10. An arrangement according to claim 1, wherein the axes of the connecting rod bolts are inclined to the longitudinal axis of the main connecting rod.

11. An arrangement according to claim 10, wherein the axes of the bolts are in mirror-image relationship.

12. An arrangement as claimed in claim 1 and further comprising a screw for holding said upper bearing part and said foot together during assembly of the bearing.

13. An arrangement according to claim 1 wherein the connecting rod bolt on the side of the bore adjacent said auxiliary connecting rod lies in a plane inclined to the longitudinal axis of the main connecting rod.

References Cited by the Examiner

UNITED STATES PATENTS

| | | | |
|---|---|---|---|
| 1,303,498 | 5/19 | Ricardo | 74—580 |
| 1,500,662 | 7/24 | Vincent | 74—580 |
| 1,687,917 | 10/28 | Woolson | 75—580 |
| 2,318,954 | 5/43 | Miller et al. | 74—580 |
| 2,552,662 | 5/51 | Barlow | 74—580 |
| 2,815,680 | 12/57 | Morris | 74—580 |

FOREIGN PATENTS

| | | |
|---|---|---|
| 806,757 | 10/36 | France. |
| 433,983 | 8/35 | Great Britain. |
| 460,530 | 1/37 | Great Britain. |
| 492,451 | 9/38 | Great Britain. |
| 580,210 | 8/46 | Great Britain. |

BROUGHTON G. DURHAM, *Primary Examiner.*